United States Patent [19]

Manning

[11] Patent Number: 5,505,774
[45] Date of Patent: Apr. 9, 1996

[54] CONTINUOUS FLOW PROCESS FOR TREATING WASTE CELLULOSIC FIBER AND PAPER MILL SLUDGE

[75] Inventor: Harold J. Manning, Pasco, Wash.

[73] Assignee: Cerad Industries, Inc., Oklahoma City, Okla.

[21] Appl. No.: 337,265

[22] Filed: Nov. 10, 1994

Related U.S. Application Data

[63] Continuation-in-part of Ser. No. 87,193, Jul. 2, 1993, abandoned, which is a continuation-in-part of Ser. No. 876,049, Apr. 30, 1992, abandoned.

[51] Int. Cl.$^6$ ..................................... C04B 16/02
[52] U.S. Cl. .................. 106/697; 106/793; 106/796; 588/256; 588/257; 210/751; 210/928; 162/4; 162/DIG. 9
[58] Field of Search .................. 106/697, 780, 106/793, 794, 796, 803; 423/DIG. 3, DIG. 18, DIG. 20; 588/252, 256, 257; 501/155; 210/750, 928, 751; 162/4, DIG. 9

[56] References Cited

U.S. PATENT DOCUMENTS

| | | | |
|---|---|---|---|
| 3,720,609 | 3/1973 | Smith et al. | 210/59 |
| 4,219,515 | 8/1980 | Helser et al. | 264/37 |
| 4,219,516 | 8/1980 | Herrington, Jr. | 264/40.7 |
| 4,428,418 | 1/1984 | Beasley et al. | 165/76 |
| 4,449,581 | 5/1984 | Blystone et al. | 165/151 |
| 4,547,290 | 10/1985 | Pichat | 210/751 |
| 4,615,809 | 10/1986 | King | 210/751 |
| 4,685,220 | 8/1987 | Meenan et al. | 34/10 |
| 4,737,238 | 4/1988 | De Ruvo | 162/4 |
| 4,799,961 | 1/1989 | Friberg | 106/93 |
| 4,849,128 | 7/1989 | Timmons et al. | 252/181 |
| 4,872,993 | 10/1989 | Harrison | 210/666 |
| 5,002,633 | 3/1991 | Maxham | 162/5 |
| 5,246,596 | 9/1993 | Baldwin, Jr. et al. | 210/751 |
| 5,340,513 | 8/1994 | Koslowski et al. | 106/796 |

FOREIGN PATENT DOCUMENTS 55-44355  3/1980  Japan .

OTHER PUBLICATIONS

National Lime Association, *Chemical Lime Facts*, Sixth Edition, (1992) *month unavailable.
Southwell Laboratory; Certificate of Analysis (Apr. 11, 1994).
Columbia Analytical Services, Inc.; Analytical Report (Feb. 28, 1990).

*Primary Examiner*—Paul Marcantoni
*Attorney, Agent, or Firm*—Head Johnson & Kachigian

[57] ABSTRACT

A continuous flow process for treating waste cellulosic fiber or paper mill sludge wherein calcium oxide, silica and water are blended with waste cellulosic fiber or paper mill sludge such that a pH is reached of between 10.5 and 12 to provide a treated mixture. The mixture is agitated such that it is dried and fluffed for use as an environmentally safe filler material.

5 Claims, 1 Drawing Sheet

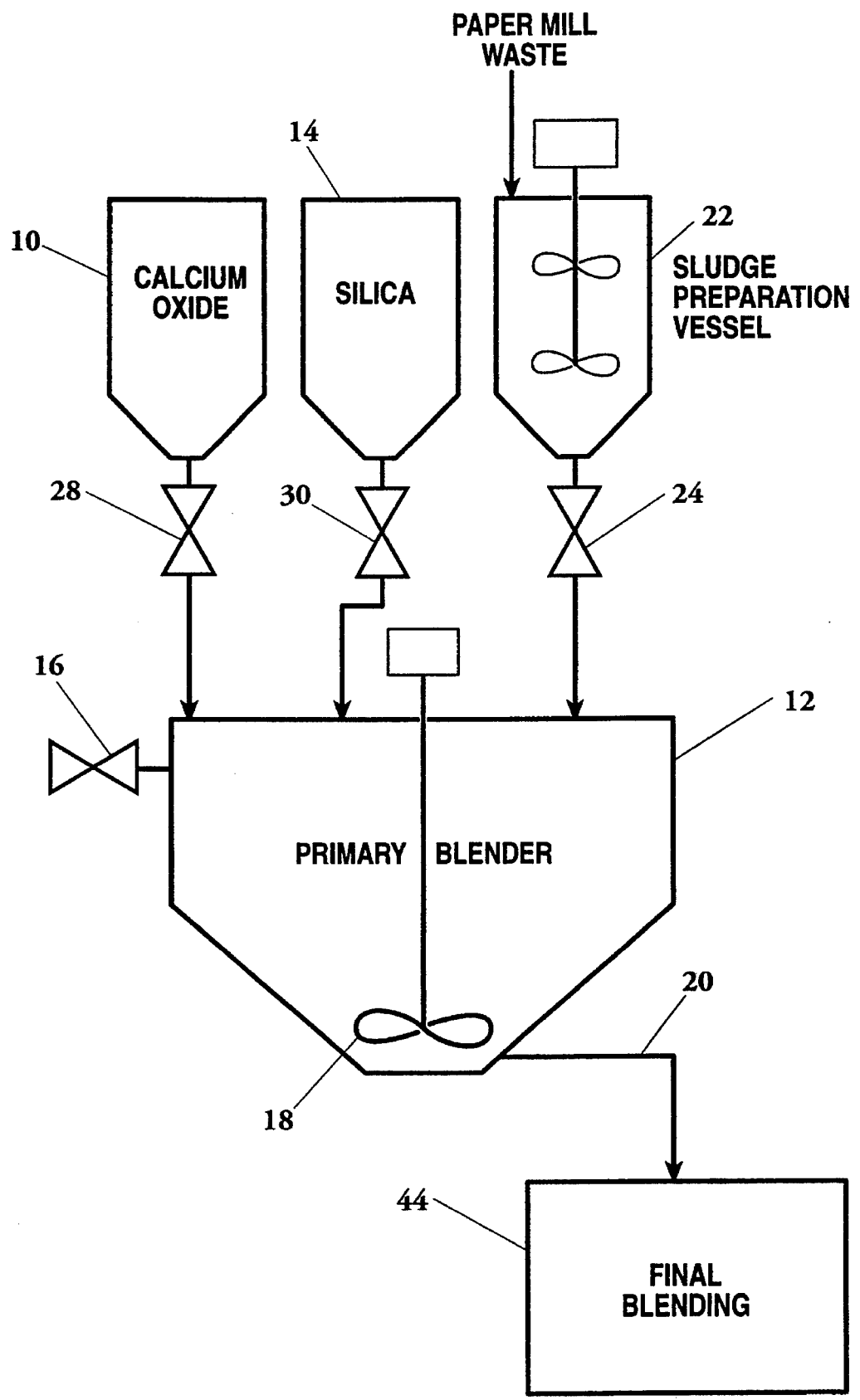

5,505,774

CONTINUOUS FLOW PROCESS FOR TREATING WASTE CELLULOSIC FIBER AND PAPER MILL SLUDGE

RELATED APPLICATIONS

This application is a continuation-in-part of U.S. patent application Ser. No. 08/087,193, filed Jul. 2, 1993, now abandoned, which is itself a continuation-in-part of U.S. patent application, Ser. No. 07/876,049, filed Apr. 30, 1992, now abandoned.

BACKGROUND OF THE INVENTION

1. Field of Invention

The present invention relates generally to a method for treating waste cellulosic fiber and paper mill sludge and, more particularly, to a continuous flow process for treating waste cellulosic fiber and paper mill sludge in an energy and time saving manner to obtain an environmentally safe material for use in a variety of applications.

2. Background

It is well known that waste cellulosic fiber and paper mill sludge, which are produced in large quantities in most industrial nations of the world today due to the large usage of paper, constitute one of our most serious environmental problems. Paper mill sludge has substantially little usage as a material that can be employed in other industrial applications. Because of its non-utility, the paper mill sludge is merely discarded, along with other waste cellulosic fiber, creating a tremendous disposal problem.

Some have attempted to find a useful purpose for such waste cellulosic fiber and paper mill sludge. In particular, U.S. Pat. No. 4,799,961 to Friberg discloses the use of pulped paper or waste material from paper mills as part of a process for forming cementious fiber impregnated constructions compositions. But the Friberg process has certain limitations that make its commercial application of questionable feasibility.

There are three basic reactionary steps in Friberg. The first is boiling a slurry of calcium oxide and siliceous material. Friberg boils this first intermediate mixture for a period of at least two hours. After boiling, Friberg must allow the mixture to stand for 3 to 5 days or more. The second step is ball milling calcium chloride, calcium oxide, calcium sulfate, iron oxide, diatomite, and portland cement to obtain a second intermediate mixture. The third step is blending the results of the first two steps to a thick paste in which portland cement, further siliceous material, fiber and other additives are mixed—other additives being up to 80% of the mixture. Friberg also dries his end product to about a 15% moisture content.

The main drawback to Friberg's method is that it is a batch process as opposed to a continuous flow process. This hampers the implementation of Friberg's process on a large scale. Further, the reactionary steps in Friberg's process require significant energy expenditures and time commitments. For instance, his boiling of his first intermediate mixture for a period of at least two hours, while not a significant expense in the context of a small batch, becomes commercially significant when a 300 ton per day fiber production run is anticipated. Still further, Friberg must allow his first intermediate mixture to stand for three to five days or more. Again, considering a 300 ton per day production run, a production rate similar to the manufacture of plywood, tile or brick, the amount of space required for storage of the intermediate mixtures is tremendous.

Another issue not addressed by Friberg is the treatment of toxic chemicals and elements contained within waste cellulosic fiber and paper mill sludge. These products typically contain dioxins which are a major source of toxic contamination of soils and water supplies. "Dioxins" as used herein means all toxic or carcinogenic substances carried by acidic water in paper mill waste sludge, including phenols, heavy metals and compounds of heavy metals.

Dioxins are suspected of causing cancer and birth defects. From the beginning of the industrial age, large quantities of materials containing dioxins have been dumped, either accidentally or deliberately, in a heretofore entirely reckless fashion. Consequently, material containing dioxins is a significant hazard to the environment. The disposal of all materials containing dioxins, and particularly paper mill sludge, has caused great concern. Incineration has been employed as a means of disposal and land burial has been the other primarily practiced method of disposal of waste cellulosic fiber and paper mill sludge. When the material is buried there always remains a possibility of the dioxins being leached out and carried into drinking water or otherwise providing a contaminant to the environment. This invention is also concerned with a method for treating waste cellulosic fiber and paper mill sludge in a way to substantially neutralize the dioxin content and, at the same time, provide a finished material that has utility. The fiber product provided as a consequence of the method to be herein disclosed is substantially free of dioxins and is an environmentally safe, usable aggregate for cement fiber board and other applications. The term "neutralize" as applied to dioxins as used herein means destroying all active toxic or potentially toxic bacteria and tying up heavy metals by combining them with a cement or binder in a manner to eliminate the potential of such metals leaching into the environment.

Friberg, however, is not concerned with the neutralization of dioxins. In fact, Friberg includes the addition of calcium chloride to his second intermediate mixture. This results in the antithesis of an end product in which toxins are substantially neutralized, as the major carrier of toxins in paper fibers, such as paper mill sludge, is in the form of chlorine dioxide. Friberg's introduction of calcium chloride in this method works, if anything, to hinder not help detoxification.

Applicant discloses and claims herein a new continuous flow process for treating waste cellulosic fiber sludge which is extremely energy efficient, which requires no significant time and storage demands, and which, therefore, is commercially practicable for large scale implementation. In addition, the process herein described provides a finished product that is substantially free of dioxins as a consequence of neutralization of the dioxins in the manufacturing process and in which any remaining dioxins are firmly bound in aggregate material that substantially eliminates the possibility of such dioxins leaching out or otherwise becoming a pollutant.

SUMMARY OF THE INVENTION

A low energy, continuous flow process is provided, whereby calcium oxide (lime), silica, such as diatomaceous earth, water, and wet paper mill sludge or other cellulosic waste are blended to form a mixture. Based on dry weights, about 30% of the mixture consists of calcium oxide and silica, while 70% of the mixture consists of paper mill sludge or other cellulosic waste. Of the calcium oxide and silica portion of the mixture, these two components are blended at a ratio of about 30 to 50, calcium oxide to silica. The blending process is carried out sufficiently to admix all components. The process is exothermic and the pH of the mixture is raised to between 10.5 and 12. The calcium oxide hydrolyzes, absorbing excess moisture from the mixture. The reaction that takes place between the calcium and silica adsorbs and neutralizes any dioxins in the waste sludge.

The fully blended and reacted result of the commingling of the paper mill waste sludge, calcium oxide and silica may then be passed along for final blending/fluffing. At the output of the final blender, a substantially dry solid material useable for admixture as a filler with cement or other similar products is obtained. No heat source or energy expenditure is required in this blending/drying step, however. Rather, it is accomplished merely by rolling or fluffing the material.

The finished material is substantially free of dioxins and any dioxins that remain are bound up in the solid component so that they are not easily leached out or otherwise separated from the aggregate material to become an ecological problem.

A better understanding of the invention will be obtained from the following description of the preferred embodiment and the claims, taken in conjunction with the attached drawing.

DESCRIPTION OF THE DRAWING

The drawing is a schematic flow diagram of the basic steps employed in practicing the method of this invention for treating paper mill waste sludge to provide a substantially dry aggregate.

DESCRIPTION OF THE PREFERRED EMBODIMENT

The process of this disclosure will be described as it particularly relates to paper mill sludge, it being understood that the process is equally applicable to other industrial or municipal waste cellulosic materials.

Referring to the drawing, the basic steps employed in practicing the invention are illustrated diagrammatically. Calcium oxide, such as in the form of lime, is provided from a storage reservoir 10 and fed through a valve 28 into a primary blender 12. Silica from a storage source 14 is also fed into primary blender 12 through a valve 30. Silica in storage source 14 may be, and preferably is, in the form of diatomaceous earth.

Paper mill sludge is delivered into a sludge preparation vessel 22. The paper mill sludge is a by-product of the production of paper and typically is an environmental contaminant, the disposal of which has been an ecological problem throughout the world. One deleterious aspect of paper mill waste sludge is that it typically contains dioxins that have been identified as a potential cause of cancer and birth defects. Heretofore utilized methods of disposing of paper mill waste sludge have been unacceptable since the typical methods have included burning or burial. Burning the paper mill sludge is an expensive method of disposal since before the paper mill waste can be burned it must be dried and in the drying process the removal of water must be conducted in such a way that it does not carry into the environment dioxins and other contaminants. Burial of the material only conceals the contaminants therein that can leach into ground water and remain as a constant potential environmental hazard. Under the principles of this invention the wet paper mill sludge is moved directly from the paper manufacturing process into the sludge preparation vessel 22. Within vessel 22 the sludge is mixed thoroughly and, if necessary, additional water can be added to provide a slurry having the proper consistency for treatment herein. The quantity of sludge passing out of sludge preparation vessel 22 is controlled by a valve structure 24.

The prepared paper mill sludge from preparation vessel 22 moves through valve structure 24 into primary blender 12. Water is fed into primary blender 12 through inlet 16. The combined materials are then thoroughly mixed. The components of the mixture are blended based on dry weights of the nonaqueous components. Calcium oxide and silica comprise about 30% of the mixture, while paper mill sludge comprises the other 70%. The calcium oxide and silica components are blended at a ratio of about 30 to 50. The reaction of this mixture of calcium oxide, silica and paper mill sludge is exothermic. The heat of reaction, and primarily the hydrolyzation of the calcium oxide, helps absorb the excess moisture from the sludge. The fibrous material contained in the waste paper sludge absorbs excess heat of the exothermic reaction. The reaction described herein takes place generally in seconds, and at the most, minutes.

By raising the pH to 10.5–11 through the addition of an excess of lime it is possible to disinfect the mixture against bacteria and some virus types. This process, called "excess alkalinity treatment" also removes most heavy metals. Lime is used in conjunction with alum or iron salts for coagulating suspended solids incident to the removal of turbidity from the "raw" water. It serves to maintain the proper pH for most satisfactory coagulation conditions. In some water treatment plants, alum sludge is treated with lime to facilitate sludge thickening on pressure filters. Blending of materials in vessel 12 is carried out for sufficient time to permit the full exothermic reaction to be completed. The reaction of lime combined with the effect of the exothermically generated heat successfully treats the water adsorbed by the blotter effect of paper fiber, neutralizing all phenolic components and coating any heavy metals.

Thorough blending of the paper mill sludge with the calcium oxide and silica is completed in primary blender 12 using a blending apparatus exemplified by agitator 18. The treated material, passes from primary blender 12 and is moved by conveyor means 20 to a final blending/fluffing and storage area 44. There the mixture is again agitated, such as by a hammer mill, to obtain a substantially dry, thoroughly mixed, uniform product. In the final blending and storage area 44 the substantially dry reacted blend of paper mill sludge, calcium oxide and silica can be packaged for shipment for other processing operations. The completed material is ideal for admixture in insulation stucco and cement grout. Dioxins, in the form of heavy metals and compounds thereof, are bound up in the final blending process at 44 to substantially eliminate the possibility of the heavy metals or compounds thereof from leaching into the environment. The fibrous product, which is substantially free of dioxins, is also an environmentally useful aggregate for the cement fiber board manufacturing industry. Thus, the process results in the transformation of an environmentally hazardous material, that is, paper mill sludge, into a useable, environmental friendly raw material.

As previously stated, the reactions that take place within primary blender 12 serve to substantially neutralize any dioxins within the waste paper sludge. However, if any dioxins are not fully neutralized they bond in the solid material resulting from the process which, when used as a binder in stucco, cement grout, fiber board manufacturing or the like, are retained in such a way that there is substantially no possibility of such dioxins being leached or otherwise passing into the environment.

As can be seen from the above disclosure, applicant is providing a continuous flow process for treating waste cellulosic fiber and paper mill sludge as opposed to the batch process of the prior art. The importance of this distinction becomes apparent when the comparative energy requirements are examined. On the one hand, Friberg boils his first intermediate mixture for a period of at least two hours. The energy (in KW) needed to raise one gallon of water from its ambient temperature (75° F.) assuming a temperature rise of 120° is about 0.58588 KW. A 2000 lb. batch (or 232.55 gallons) would require the expenditure of 136.246 KW of energy, which, at an average cost of $0.10 per KW would equal a $13.62 manufacturing expense. It must be remembered that only 400 lbs. of this 2000 lb. batch is composed of fiber. Friberg's ball-milling step is also energy intensive as is his drying step. Moreover, his end yield, due to drying back to 15% moisture in the finished product, would be about 681.95 lbs. Again, these energy expenses become very significant when calculating an average daily commercial plant production run of 300 tons of fiber. The daily energy cost for just the boiling step of Friberg's process on this large scale would be $20,430.

On the other hand, applicant's invention uses only about 250 horsepower per day at a production rate of 300 tons. This is due to applicant's process being a continuous flow process using exothermic chemical reactions as the only source of heat energy. Moreover, applicant does not use energy in a ball-milling step nor in a significant drying procedure. Drying is minimal in applicant's process, due to the end fiber product being almost dry to the touch when in the final blending stage, with an average moisture content of 30% or less. Mixing is completed in applicant's chemical reaction mixture in seconds, and the product may be simply fluff-mixed for thorough agglomeration.

Applicant's continuous flow process also saves time over the prior art process. After boiling his initial intermediate mixture for a minimum of two hours, Friberg must allow the mixture to stand for three to five days or more. Applicant's invention has no similar requirement as it is a continuous flow process. There are no intermediate mixtures which must set for any time period before their use.

That applicant's invention is a continuous flow process also relieves the practitioner from unreasonable storage requirements for large scale commercial production. Since Friberg requires a batching time of at least three days, a production plant would require holding tanks equivalent to three times the daily output of Friberg's first intermediate mixture. This would require storage of approximately 35,000 gallons of treated product per day, as opposed to applicant's process which does not require such storage and hence no similar capital outlay for large tankage.

It should be apparent to those knowledgeable in the art of producing wall board or fiber board that large scale production in accordance with Friberg's process is of questionable feasibility without pump mixers and associated blending and batching. Applicant's process requires, at the most, surge bins and containers for control through the manufacturing process. No added heat or drying is required, as only enough water is added to the mixture components to excite the chemical reaction of the calcium oxide.

Applicant's process also insures a complete reaction of any dioxin containing fibrous material with the neutralizing components of the process. This type of full reaction of fiber is not insured by the Friberg process, as Friberg adds fiber in many steps throughout his process hindering proper neutralization.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A continuous flow process for treating waste cellulosic fiber or paper mill sludge to obtain an environmentally safe filler material, said process comprising the steps of:

(a) providing (1) a calcium oxide reservoir connected by a first conduit and valve assembly to a primary blender, (2) a silica reservoir connected by a second conduit and valve assembly to said primary blender, and (3) a water source for injecting water into said primary blender, said calcium oxide and said silica being blended at a ratio of about 30:50;

(b) delivering said waste cellulosic fiber or said paper mill sludge to a sludge preparation vessel for thorough mixing to obtain a prepared slurry, said sludge preparation vessel having a mixing agitator and being connected by a third conduit and valve assembly to said primary blender;

(c) simultaneously and continuously discharging said calcium oxide, said silica, said water and said prepared slurry, all at ambient temperature, into said primary blender while blending such that an exothermic reaction is achieved and a pH is reached of between 10.5 and 12 to obtain a finished mixture; and (d) milling said finished mixture without the addition of heat until said mixture is dry to the touch.

2. A continuous flow process according to claim 1 wherein said calcium oxide and silica are blended with said prepared slurry at a ratio of 30% said calcium oxide and said silica to 70% said waste cellulosic fiber or paper mill sludge by dry weight.

3. A continuous flow process according to claim 1 wherein said silica is in the form of diatomaceous earth.

4. A continuous flow process for treating waste cellulosic fiber or paper mill sludge to obtain an environmentally safe filler material, said process comprising the steps of:

(a) providing (1) a calcium oxide reservoir connected by a first conduit and valve assembly to a primary blender, (2) a silica reservoir connected by a second conduit and valve assembly to said primary blender, and (3) a water source for injecting water into said primary blender;

(b) delivering said waste cellulosic fiber or said paper mill sludge to a sludge preparation vessel for thorough mixing to obtain a prepared slurry, said sludge preparation vessel having a mixing agitator and being connected by a third conduit and valve assembly to said primary blender;

(c) simultaneously and continuously discharging said calcium oxide, said silica, said water and said prepared slurry, all at ambient temperature, into said primary blender while blending such that an exothermic reaction is achieved and a pH is reached of between 10.5 and 12 to obtain a finished mixture, said calcium oxide, said silica, and said waste cellulosic fiber or paper mill sludge being blended at a ratio based upon dry weights of about 11.25% said calcium oxide, 18.75% said silica, and 70% said waste cellulosic fiber or paper mill sludge; and (d) milling said finished mixture without the addition of heat until said mixture is dry to the touch.

5. The continuous flow process according to claim 1, wherein said waste cellulosic fiber or said paper mill sludge is mixed in said sludge preparation vessel with an amount of water sufficient to yield said prepared slurry.

* * * * *